United States Patent
Silva et al.

(10) Patent No.: US 6,833,422 B2
(45) Date of Patent: Dec. 21, 2004

(54) METHOD OF PREPARING TRANSPARENT SILICONE-CONTAINING COPOLYCARBONATES

(75) Inventors: James Manio Silva, Clifton Park, NY (US); David Michel Dardaris, Ballston spa, NY (US); Gary Charles Davis, Albany, NY (US)

(73) Assignee: General Electric Company, Niskayuna, NY (US)

( * ) Notice: Subject to any disclaimer, the term of this patent is extended or adjusted under 35 U.S.C. 154(b) by 146 days.

(21) Appl. No.: 10/223,037

(22) Filed: Aug. 16, 2002

(65) Prior Publication Data

US 2004/0039145 A1 Feb. 26, 2004

(51) Int. Cl.⁷ .................................. C08G 77/04
(52) U.S. Cl. .............................. 528/29; 528/25
(58) Field of Search ........................ 528/25, 29

(56) References Cited

U.S. PATENT DOCUMENTS

| | | | |
|---|---|---|---|
| 5,214,118 A | * | 5/1993 | Hawkins et al. ............... 528/26 |
| 5,502,134 A | | 3/1996 | Okamoto et al. |
| 5,530,083 A | | 6/1996 | Phelps et al. |
| 6,103,855 A | | 8/2000 | Silva et al. |
| 6,268,461 B1 | | 7/2001 | Fyvie et al. |
| 6,392,079 B1 | | 5/2002 | Silva et al. |
| 6,492,481 B1 | * | 12/2002 | Davis et al. ................... 528/29 |
| 6,630,525 B2 | * | 10/2003 | Cella et al. ................... 524/100 |

FOREIGN PATENT DOCUMENTS

| | | |
|---|---|---|
| EP | 764676 | 3/1997 |
| EP | 500131 | 1/2001 |
| JP | 9265663 | 10/1997 |
| WO | WO0204545 | 1/2002 |

OTHER PUBLICATIONS

English language translation of Japanese Patent 9265663.

* cited by examiner

*Primary Examiner*—Margaret G. Moore
(74) *Attorney, Agent, or Firm*—Andrew J. Caruso; Patrick K. Patnode

(57) ABSTRACT

Silicone-containing copolycarbonates possessing relatively long siloxane chains and yet having low haze values and hence transparency are prepared by reacting a siloxane bischloroformate with a hydroxy-terminated polycarbonate oligomer to afford a silicone-containing polycarbonate intermediate which is then reacted with a bisphenol, phosgene and a chainstopper under interfacial reaction conditions to afford a product silicone-containing copolycarbonate. The product silicone-containing copolycarbonates have lower haze values than similarly constituted copolycarbonates prepared by other methods.

21 Claims, 1 Drawing Sheet

METHOD OF PREPARING TRANSPARENT SILICONE-CONTAINING COPOLYCARBONATES

RELATED APPLICATION

This application is closely related to copending U.S. application Ser. No. 10/223,030 and incorporates the above referenced application by reference in its entirety.

BACKGROUND OF THE INVENTION

This invention relates to a method for the preparation of silicone-containing copolycarbonates. More particularly the method relates to a method for obtaining silicone-containing copolycarbonates which are transparent.

Silicone-containing copolycarbonates are prized for their unique combination of ductility, toughness, and flame retardance. Silicone copolycarbonates are typically prepared by reaction of a mixture of a siloxane-containing bisphenol and a bisphenol such as bisphenol A under interfacial conditions with phosgene and an aqueous acid acceptor such as sodium hydroxide in water. Alternatively, siloxane-containing copolycarbonates may be prepared by reaction of a chloroformate-terminated polycarbonate oligomer with a siloxane-containing bisphenol. Typically, the reaction between the chloroformate-terminated polycarbonate oligomer and the siloxane-containing bisphenol is carried out under interfacial conditions similar to those employed when a bisphenol and a siloxane-containing bisphenol are copolymerized directly with phosgene. Such approaches to silicone-containing copolycarbonates are illustrated in Japanese Patent Application JP 9265663, European Patent Application EP 500131, U.S. Pat. No. 5,530,083, U.S. Pat. No. 5,502,134, and copending U.S. patent application Ser. No. 09/613,040.

In copending U.S. patent application Ser. 09/613,040 a group of silicone-containing copolycarbonates is disclosed which are substantially single phase and transparent. However, transparent silicone-containing copolycarbonates could be obtained only when siloxane chain lengths were short (less than about 20 $Me_2SiO$ units). It would be economically advantageous to produce transparent silicone-containing copolycarbonates having relatively long siloxane chain lengths. The present invention provides a method for the preparation of silicone-containing copolycarbonates which remain transparent even when the siloxane chain lengths are relatively long.

BRIEF SUMMARY OF THE INVENTION

In one aspect, the present invention provides a method of preparing silicone-containing copolycarbonate compositions, said method comprising:

Step (a) contacting a hydroxy-terminated polycarbonate oligomer with a siloxane bischloroformate under interfacial reaction conditions to afford a silicone-containing polycarbonate intermediate;

Step (b) reacting said intermediate under interfacial reaction conditions with at least one bisphenol, at least one endcapping agent, and phosgene to provide a silicone-containing copolycarbonate.

In another aspect, the present invention relates to the silicone-containing copolycarbonate compositions prepared by the method of the present invention. In yet another aspect, the present invention relates to silicone-containing polycarbonate intermediates useful in materials synthesis.

DETAILED DESCRIPTION OF THE INVENTION

Figure 1:
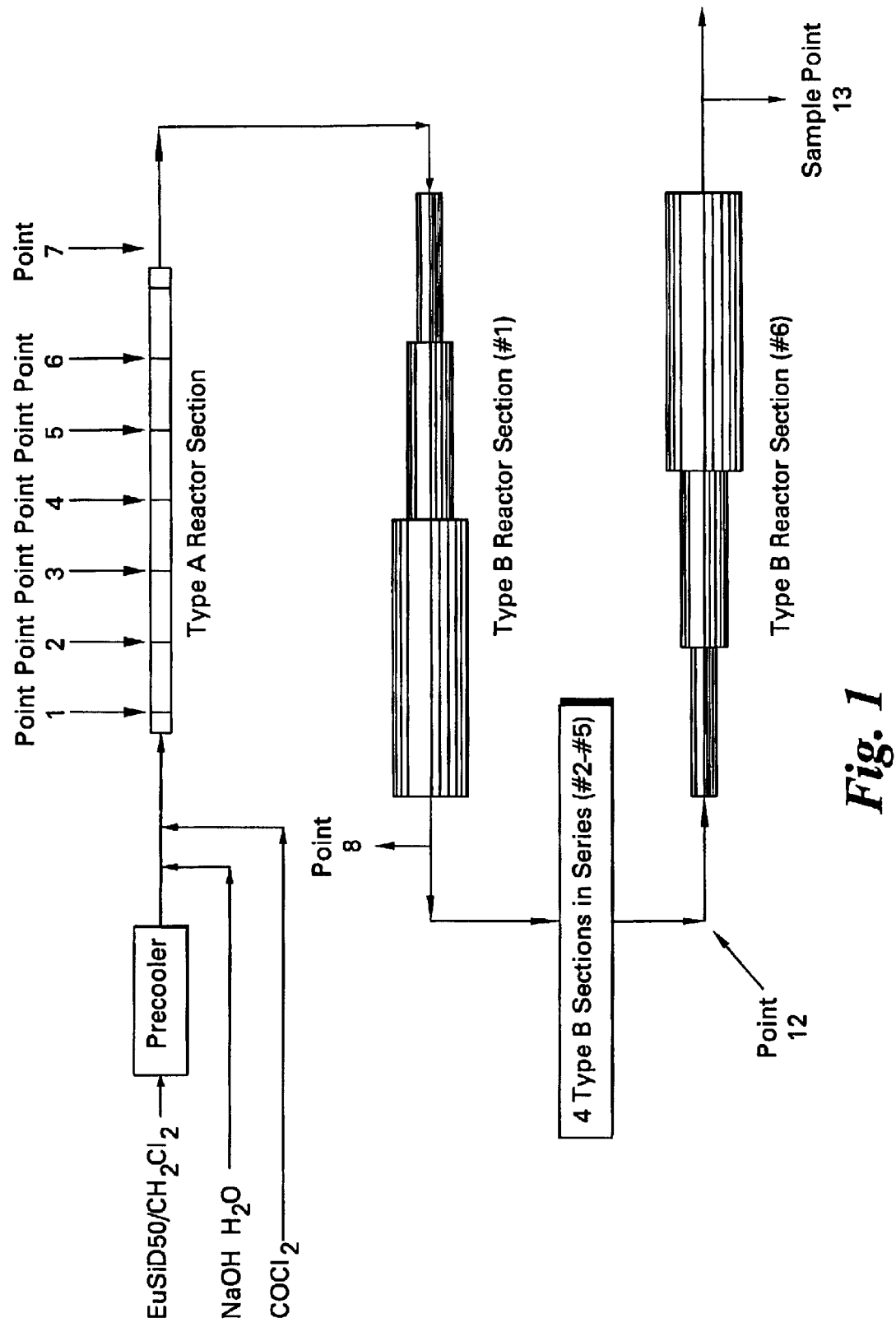
FIG. 1 illustrates a tubular reactor system suitable for use in the production of bischloroformates of siloxane bisphenols.

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and homopolycarbonates.

As used herein, the term "hydroxy-terminated polycarbonate oligomer" refers to an oligomeric polycarbonate at least about 75 percent of the terminal groups of which are hydroxy groups. Expressed another way, a "hydroxy-terminated oligomeric polycarbonate" is an oligomeric polycarbonate having a percent endcapping of less than about 25 percent.

As used herein, the term "hydroxy-terminated polycarbonate oligomer" may refer to a single molecular species, for example a purified linear hydroxy terminated polycarbonate pentamer comprising 5 bisphenol A residues and 4 carbonyl groups, said polycarbonate pentamer having a molecular weight of about 1244 grams per mole. Alternatively, the term hydroxy-terminated polycarbonate oligomer" may refer to an oligomeric polycarbonate mixture in which a plurality of linear hydroxy terminated polycarbonate species having different molecular weights are present, for example an oligomeric bisphenol A polycarbonate mixture comprising linear hydroxy terminated bisphenol A polycarbonate oligomers ranging in length from about 2 to about 20 repeat units.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the terms "siloxane-containing bischloroformates" and the term "siloxane bischloroformates" are used interchangeably and refer broadly to any bischloroformate comprising one or more siloxane units. Siloxane bischloroformates comprise as a subgroup bischloroformates of siloxane bisphenols.

As used herein, the term "bischloroformates of siloxane bisphenols" refers to bischloroformates prepared from siloxane-containing bisphenols or their equivalents. The disodium salt of a siloxane bisphenol is an example of a species which would function as the equivalent of a siloxane bisphenol.

As used herein, the terms "siloxane-containing bisphenol" and "siloxane bisphenol" are interchangeable and have the same meaning. Siloxane bisphenols are dihydroxy aromatic compounds incorporating one or more siloxane repeat units. Typically, the siloxane bisphenols used to prepare the siloxane bischloroformates are isomeric mixtures, said isomeric mixtures arising in a double hydrosilylation reaction which is typically a synthetic step in the preparation of siloxane bisphenols. Typically, the isomeric mixtures comprise a single major isomer. It will be understood by those skilled in the art, however, that the structures III and IX respectively given for the eugenol siloxane bischloroformate and eugenol siloxane bisphenol used in the Examples and Comparative Examples are idealized in that they represent only the major isomer present in an isomeric mixture. Similarly, each of structures IV–VII represents an idealized structure meant to encompass instances in which said structures represent only a major isomer present in an isomeric mixture of siloxane bischloroformates. The description above should not be construed, however, as limiting the present invention to the use of isomeric mixtures of siloxane bischloroformates. The use of siloxane bischloroformates which are essentially single isomers falls well within the ambit of the instant invention.

As used herein, the term "d-50 eugenol siloxane bisphenol" indicates a eugenol siloxane bisphenol having structure IX wherein the average value of the integer p is about 50. For convenience sake the term "d-50 eugenol siloxane bisphenol" is abbreviated EuSiD50.

As used herein, the term oligomeric polycarbonate is defined as a polycarbonate having a weight average molecular weight, $M_w$, of less than 15,000 daltons.

As used herein the term "percent endcap" refers to the percentage of polycarbonate chain ends which are not hydroxyl groups. For example, in the case of bisphenol A polycarbonate prepared by reaction of diphenyl carbonate and bisphenol A in the melt, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl, cyclohexyl, 2-cyclohexylethy-1-yl, tetrahydrofuranyl and the like.

In one aspect the present invention relates to a method for preparing silicone-containing copolycarbonates. The method involves reacting under interfacial conditions a siloxane bischloroformate with a hydroxy terminated polycarbonate oligomer to afford a silicone-containing polycarbonate intermediate. The silicone-containing polycarbonate intermediate is then further reacted under interfacial conditions with phosgene, at least one bisphenol, and at least one endcapping agent to afford a silicone-containing copolycarbonate. In an alternative embodiment, the silicone-containing polycarbonate intermediate is then further reacted under interfacial conditions with phosgene, a hydroxy-terminated polycarbonate oligomer (instead of the bisphenol), and optionally at least one endcapping agent. Siloxane bischloroformates are advantageously prepared in a flow reactor as described in copending U.S. patent application No. 10/223,030 which is incorporated herein by reference in its entirety. Experimental details on the preparation of siloxane bischloroformates are provided in the experimental section of the instant application.

The hydroxy terminated polycarbonate oligomer used in the first step of the invention (Step (a)) and which may be used optionally in step (b), has a weight average molecular weight as determined by gel permeation chromatography using polystyrene molecular standards of between about 500 and 15000 daltons, preferably between about 500 and about 5000 daltons, and still more preferably between about 1000 and about 3000 daltons. Typically the hydroxy terminated polycarbonate oligomer will be fully "hydroxy terminated" meaning that essentially all of the terminal groups present are hydroxy groups. In some instances, however, it may be advantageous to employ a hydroxy terminated polycarbonate oligomer which possesses endgroups other than hydroxyl groups, for example phenoxy groups. Thus in one embodiment the present invention uses a hydroxy terminated polycarbonate oligomer having a percent endcap of less than about 25 percent, preferably less than about 15 percent, and still more preferably less than about 5 percent.

Hydroxy terminated polycarbonate oligomers may be prepared by a variety of methods including reaction of at least one dihydroxy aromatic compound with less than one equivalent of phosgene under reaction conditions analogous to those used in the preparation of interfacially prepared polycarbonate, for example the reaction conditions employed in Examples 4–6. Alternatively, hydroxy terminated polycarbonate oligomers may be prepared by reaction of at least one dihydroxy aromatic compound with a diaryl carbonate under melt polymerization conditions, for example heating one mole a diaryl carbonate such as diphenyl carbonate with a molar excess of a dihydroxy aromatic compound such as bisphenol A in a melt polymerization reactor under conditions analogous to those described in U.S. Pat. No. 6,300,460 which is hereby incorporated by reference in its entirety. The hydroxy terminated polycarbonate oligomers whether prepared under interfacial conditions or under melt polymerization conditions are said to comprise structural units derived from said dihydroxy aromatic compounds.

Dihydroxy aromatic compounds which may be employed to prepare hydroxy-terminated polycarbonate oligomers include aromatic diols such as hydroquinone, resorcinol, methylhydroquinone, 2,6-dihydroxynaphthalene, 1,4-dihydroxynaphthalene, 4-methylresorcinol, and 5-methylresorcinol. In addition, dihydroxy aromatic compounds which may be employed to prepare hydroxy-terminated polycarbonate oligomers include bisphenols having structure I

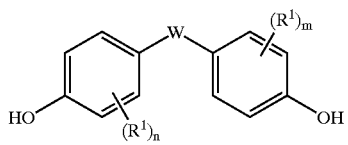

wherein R¹ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

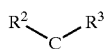

wherein R² and R³ are independently a hydrogen atom, $C_1$–$C_{20}$ alkyl group, $C_4$–$C_{20}$ cycloalkyl group, or $C_4$–$C_{20}$ aryl group; or R² and R³ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Bisphenols having structure I are exemplified by bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; and 1,4-bis(2-(4-hydroxy-3-methylphenyl)-2-propyl)benzene.

The siloxane bischloroformates employed according to the method of the present invention include siloxane bischloroformates comprising structure II

wherein R⁴ is independently at each occurrence a $C_1$–$C_{10}$ alkylene group optionally substituted by one or more $C_1$–$C_{10}$ alkyl or aryl groups, an oxygen atom, an oxyalkyleneoxy moiety —O—$(CH_2)_t$—O—, or an oxyalkylene moiety —O—$(CH_2)_t$—, where t is an integer from 2–20;

R⁵ and R⁶ are each independently at each occurrence halogen, $C_1$–$C_6$ alkoxy, $C_1$–$C_6$ alkyl, or $C_6$–$C_{10}$ aryl;

z and q are independently integers from 0–4;

R⁷, R⁸, R⁹ and R¹⁰ are each independently at each occurrence $C_1$–$C_6$ alkyl aryl, $C_2$–$C_6$ alkenyl, cyano, trifluoropropyl, or styrenyl; and p is an integer from 1 to about 100.

Although the siloxane bischloroformates of the present invention include those bischloroformates represented by structure II, said siloxane bischloroformates include, in addition, any bischloroformate comprising one or more siloxane units $[R^9R^{10}SiO]$ wherein R⁹ and R¹⁰ are defined as in structure II, for example alpha, omega siloxane bischloroformates such as $ClOCOSiMe_2[OSiMe_2]_pOCOCl$ wherein p is defined as in structure II, said siloxane bischloroformates being prepared from the corresponding hydroxy terminated polydimethylsiloxanes. Siloxane bischloroformates further include bischloroformates of aliphatic siloxane-containing diols such as $ClOCOR^4SiMe_2[OSiMe_2]_pR^4OCOCl$ wherein R⁴ is defined as in structure II. Bischloroformates of aliphatic siloxane-containing diols are exemplified by the product obtained by silylation of allyl alcohol with a siloxane dihydride such as $HSiMe_2[OSiMe_2]_pH$ wherein p is about 50, followed by reaction of the product aliphatic siloxane-containing diol with phosgene.

Bischloroformates having structure II are exemplified by eugenol siloxane bischloroformate III

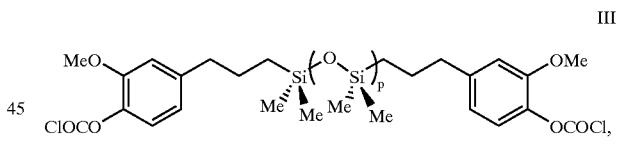

4-allyl-2-methylphenyl siloxane bischloroformate IV

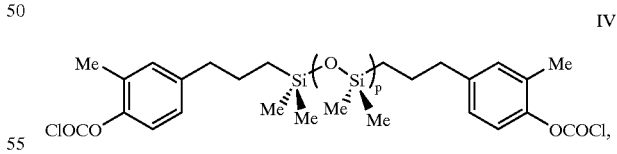

2-allylphenyl siloxane bischloroformate V

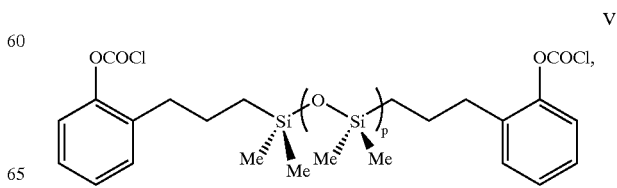

4-allylphenyl siloxane bischloroformate VI

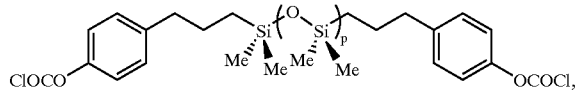

4-allyloxyphenyl siloxane bischloroformate VII

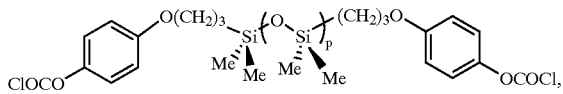

and 4-vinylphenyl siloxane bischloroformate VIII

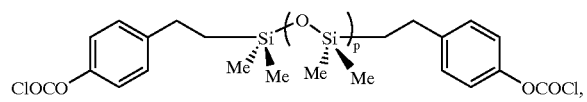

wherein in structures II–VIII p is an integer from 1 to about 100.

The siloxane bischloroformates used according to the method of the present invention are typically prepared from the corresponding dihydroxy compound. For example, eugenol siloxane bischloroformate III is typically prepared by phosgenation of eugenol siloxane bisphenol IX

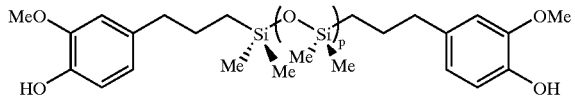

wherein p is an integer from 1 to about 100.

In one aspect, it has been found that control over the properties, for example transparency, of the product silicone-containing copolycarbonates may be exercised by controlling the purity of the siloxane bischloroformate employed. In one embodiment, the present invention employs high purity bischloroformates having low levels of residual hydroxy endgroups. Thus, siloxane bisphenols are converted using methods described herein and in copending U.S. patent application Ser. No. 10/223,0303 into the corresponding siloxane bischloroformates having structure II, the siloxane bischloroformates II containing less than 10 percent, preferably less than 5 percent and even more preferably less than 1 percent residual hydroxy endgroups. The term "residual hydroxy endgroups" refers to those hydroxy groups present in the starting siloxane bisphenol which are not converted to the corresponding chloroformate groups in the product bischloroformate. The principal impurities present in the product siloxane bischloroformate are the starting siloxane bisphenol and bischloroformate half product which may be assayed by $^1$H-NMR spectroscopy. Typically, the smaller the amount of residual hydroxy endgroup present in the siloxane bischloroformate employed, the lower the haze value observed for the product silicone-containing copolycarbonate. (Compare, for example, Examples 7–11 with Examples 12–14) Haze values may be used to quantitate a siloxane-containing copolycarbonate's transparent, translucent or opaque appearance to the human eye.

As used herein, "interfacial reaction conditions" refer to reaction mixtures at a temperature in a range between about 0° C. and about 100° C., said mixtures comprising reactants and, in addition, a water immiscible solvent, at least one catalyst, an aqueous phase comprising an alkali metal hydroxide, alkaline earth metal hydroxide, or a mixture thereof. Suitable catalysts may be selected from among catalysts which promote the polymerization reaction of bisphenols with phosgene under interfacial reaction conditions. Such catalysts include amine catalysts, phase transfer catalysts, and mixtures thereof. Amine catalysts include aliphatic tertiary amine catalysts such as triethylamine, N-butyl-N,N-dimethylamine, Honig's Base, diazabicyclooctane, N-methylpiperidine, and the like. Among aliphatic and cycloaliphatic tertiary amine catalysts, triethylamine is frequently preferred. Amine catalysts include aromatic tertiary amine catalysts such as 4-N,N-dimethylaminopyridine, 2-N,N-dimethylaminopyridine, and the like. Among aromatic tertiary amine catalysts, 4-N,N-dimethylaminopyridine is frequently preferred. Phase transfer catalysts include ammonium salt catalysts, phosphonium salt catalysts, sulfonium salt catalysts, and the like. Ammonium salt catalysts are illustrated by salts comprising organic quaternary ammonium cations such as trimethylammonium chloride, tributylammonium chloride, decyldimethylammonium chloride, dimethylundecylammonium chloride, dimethyldodecylammonium chloride, dimethyltridecylammonium chloride, dimethyltetradecylammonium chloride, and the like. Phosphonium salt catalysts are illustrated by salts comprising organic quaternary phosphonium cations such as tetramethylphosphonium hydroxide, terabutylphosphonium acetate, and the like. Sulfonium salt catalysts are illustrated by salts comprising organic sulfonium cations such as trimethylsulfonium chloride and the like.

The amount of catalyst employed is typically an amount effective to promote the polymerization reaction and may range from about 0.0001 moles to about 0.5 moles of catalyst per mole of phosgene employed.

In the first step of the method of the instant invention contacting the hydroxy terminated polycarbonate oligomer with the siloxane bischloroformate is typically carried out in a mixture comprising a water immiscible solvent, an aqueous phase comprising sufficient alkali metal hydroxide or alkaline earth metal hydroxide to maintain the pH of the aqueous phase between about 9 and about 13, preferably between about 10 and about 12, and a catalyst, said contacting being carried out at a temperature in a range between about 0° C. and about 50° C., conditions generally conducing to reaction between the hydroxyl groups of the hydroxy-terminated polycarbonate oligomer and the chloroformate groups of the siloxane bischloroformate. These general conditions are referred to herein as "contacting under interfacial conditions". The relative amounts of the hydroxy-terminated polycarbonate oligomer and the siloxane bischloroformate may vary widely. Typically, however, the amount of siloxane bischloroformate employed will be between about 0.5 and about 50 percent of the weight of the hydroxy-terminated polycarbonate oligomer employed, preferably between about 1 and about 20 percent of the weight of the hydroxy-terminated polycarbonate oligomer employed. Depending on the relative molar amounts of the hydroxy-terminated polycarbonate oligomer and the siloxane bischloroformate, the product of this reaction will be an oligomeric or polymeric species possessing either chloroformate or hydroxyl endgroups. Polymeric species are defined herein as having a weight average molecular weight ($M_w$) of greater than 15000 daltons. The product of this reaction is simply referred to as a "silicone-containing polycarbonate intermediate" and is understood to have a molecular weight which is higher than the starting hydroxy-terminated oligomer and lower than the silicone-containing copolycarbonate product. Typically, the silicone-containing polycarbonate intermediate comprises between about 0.1 and about 40 weight percent siloxane. Thus, in one aspect the present invention provides a method of preparing a silicone-containing polycarbonate intermediate. In anther aspect, the present invention provides a silicone-containing polycarbonate intermediate prepared by the method of the present invention. In one embodiment the silicone-containing polycarbonate intermediate comprises between about 1 and about 40 weight percent siloxane and has a weight average molecular weight in a range between about 1000 daltons and about 15000 daltons. Those skilled in the art will appreciate that such silicone-containing polycarbonate intermediates may be useful in a variety of materials synthesis applications including, but not limited to, the preparation silicone-containing copolycarbonates having low haze values.

In one embodiment, in the second step of the method of the present invention the silicone-containing polycarbonate intermediate is further reacted with at least one bisphenol, at least one endcapping agent, and phosgene under interfacial reaction conditions. Typically, this is effected by simply adding the bisphenol, endcapping agent, and phosgene to the reaction mixture in which the silicone-containing polycarbonate intermediate was produced and continuing the reaction. Under such circumstances, one or both of the bisphenol and endcapping agent may, for example, be added together or separately, or before or during the phosgene addition. Additional solvent and water may be added if conditions or convenience so require. The bisphenol employed may be a dihydroxy benzene or dihydroxy naphthalene, for example hydroquinone, resorcinol, methylhydroquinone, 2,6-dihydroxynaphthalene, 1,4-dihydroxynaphthalene, 4-methylresorcinol, or 5-methylresorcinol. Alternatively the bisphenol employed may be a bisphenol having structure I. Suitable bisphenols for use in the second step of the method of the present invention are illustrated by bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. Typically, the repeat units derived from the bisphenol introduced into the product silicone-containing copolycarbonate during the second step comprise between about 0.1 and about 95 percent by weight of the product silicone-containing copolycarbonate.

The endcapping agent used according to the method of the present invention is not particularly limited but is typically at least one monohydroxy aromatic compound, aliphatic acid chloride, aromatic acid chloride, aliphatic monochloroformate, aromatic monochloroformate, or a mixture thereof. Aliphatic acid chlorides are illustrated by pivaloyl chloride. Aromatic acid chlorides are illustrated by benzoyl chloride. Aliphatic monochloroformates are illustrated by ethylchloroformate. Aromatic monochloroformates are illustrated by phenylchloroformate.

In one embodiment the endcapping agent used according to the method of the present invention is a monohydroxy aromatic compound having structure X

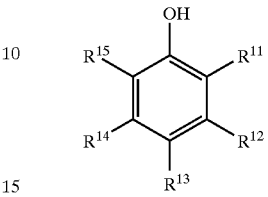

X wherein $R^{11}$—$R^{15}$ are independently a hydrogen atom, a halogen atom, a $C_1$–$C_{20}$ alkyl group, a $C_6$–$C_{20}$ aryl group, a $C_7$–$C_{21}$ aralkyl group, a $C_5$–$C_{20}$ cycloalkyl group, a $C_2$–$C_{20}$ aliphatic radical,. a $C_4$–$C_{20}$ cycloaliphatic radical, or a $C_5$–$C_{20}$ aromatic radical.

Monohydroxy aromatic compounds having structure X are illustrated by phenol, p-cumylphenol, cardanol, octadecylphenol, dodecylphenol, mesitol, 2,6-xylenol; 2,4-xylenol; 2,5-xylenol 2,3,5-xylenol; 2,3,6-xylenol; 2,4,6-triethylphenol; 2,4-di-t-butylphenol, 3,5-di-t-butylphenol, 2,6-dimethyl-4-nonylphenol; 2,6-dibromophenol; 2,5-dibromophenol; 2,6-dichlorophenol; 2,5-dichlorophenol 4-chloro-2,6-dibromophenol; 4-bromo-2,6-dichlorophenol; 2,4,6-tribromophenol; 2,3,6-tribromophenol; 2,4,6-trichlorophenol; 2,3,6-trichlorophenol; 2,6-dimethyl-4-bromophenol; 4-t-butyl-2,6-dimethylphenol; 2,6-di-t-butyl-4-methylphenol, 3-t-butyl-2,6-dimethyl phenol; 2,6-diphenylphenol; 2-phenylphenol, 2-methyl-6-phenylphenol; 2-methyl-4-phenylphenol; 2,6-dimethyl-4-phenylphenol; 4-propenylphenol, and 4-(4-hydroxyphenyl)-2,2,4-trimethylchroman.

Alternatively, the endcapping agent may be a hydroxy terminated polycarbonate oligomer comprising about 50 percent aryloxy endgroups and about 50 percent hydroxy endgroups. Typical aryloxy endgroups are illustrated by the phenoxy, p-cumylphenoxy and 4-tert-butylphenoxy groups.

The preparation of silicone-containing copolycarbonates using the method of the present invention may be carried out in a batch mode or a continuous mode. Although the working examples presented herein represent batch mode operation, those skilled in the art will be able to adapt the method to operation in a continuous mode without undue experimentation.

In one aspect the present invention is a silicone-containing copolycarbonate prepared by the method of the present invention. In one embodiment the silicone-containing copolycarbonate prepared by the method of the present invention has a haze value measured as described herein of less than 10 percent. In another embodiment, the silicone-containing copolycarbonate prepared by the method of the present invention has a haze value measured as described herein of less than 5 percent.

In one embodiment the instant invention is a method of preparing silicone-containing copolycarbonates said method comprising:

Step (a) contacting under interfacial reaction conditions to afford a silicone-containing polycarbonate intermediate, a hydroxy-terminated bisphenol A polycarbonate oligomer having a weight average molecular weight in a range from about 1000 to about 3000 daltons with eugenol siloxane bischloroformate III

III

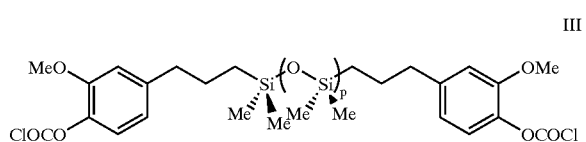

wherein p is an integer in a range between 1 and about 100; and

Step (b) reacting said intermediate under interfacial reaction conditions with bisphenol A, p-cumylphenol, and phosgene to provide a silicone-containing copolycarbonate comprising between about 0.1 and about 40 percent by weight siloxane units.

In yet another aspect the instant invention is a silicone-containing copolycarbonate prepared by the method of the present invention, said siloxane-containing copolycarbonate consisting essentially of structural units derived from bisphenol A, eugenol bischloroformate, and p-cumylphenol. In one embodiment said siloxane-containing copolycarbonate consisting essentially of structural units derived from bisphenol A, eugenol bischloroformate, and p-cumylphenol has a haze value measured as described herein of less than 10 percent. In another embodiment, said siloxane-containing copolycarbonate consisting essentially of structural units derived from bisphenol A, eugenol bischloroformate, and p-cumylphenol has a haze value measured as described herein of less than 5 percent.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC). Product silicone-containing copolycarbonates were characterized as having a "weight percent siloxane" (wt % siloxane) which was determined by $^1$H-NMR, and was the ratio of the mass of the dimethyl siloxane units present in the product polymer to the total mass of the product polymer. The starting siloxane bisphenol, d-50 eugenol siloxane bisphenol (EuSiD50), used in the preparation of siloxane bischloroformates was itself prepared by hydrosilylation of approximately two equivalents of eugenol with approximately one equivalent of the d-50 siloxane dihydride, $HSiMe_2(OSiMe_2)_{50}H$, under known hydrosilylation conditions, for example those taught in copending U.S. application Ser. No. 09/613,040. The product eugenol siloxane bisphenol was shown by $^1$H-NMR to be a mixture of isomeric siloxane bisphenols approximately 95 percent of which had structure IX and about 5 percent had structure XI

XI

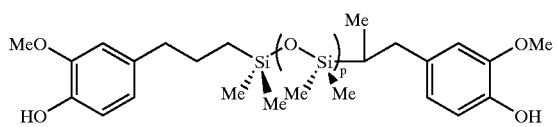

wherein p is a range of integers having an average value of about 50. As mentioned, isomeric mixtures such as the mixture of siloxane bisphenols having structures IX and XI are idealized as having the structure of the major isomer IX for reasons of convenience. Those skilled in the art will understand that the olefin hydrosilylation chemistry employed to produce bisphenol siloxanes will almost invariably produce the product siloxane bisphenols as a mixture of isomers, said mixture of isomers frequently being inseparable and yet useful in materials synthesis. Those skilled in the art will likewise understand that the conversion of a mixture of isomeric siloxane bisphenols to the corresponding bischloroformates will necessarily produce an isomeric mixture of siloxane bischloroformates. As in the case of the siloxane bisphenols, the structures of said siloxane bischloroformates are idealized herein as having the structure of the major siloxane bischloroformate isomeric component. Thus, the eugenol siloxane bischloroformate employed herein was an approximately 95:5 mixture of the siloxane bischloroformates corresponding to siloxane bisphenols IX and XI. For convenience in describing the practice and attributes of the instant invention, isomeric mixtures of eugenol siloxane bischloroformates are treated as having idealized structure III.

Percent conversion of eugenol siloxane bisphenol OH groups to the corresponding chloroformate groups was determined by proton NMR spectroscopy ($^1$H-NMR). Similarly, carbonate formation could be detected using $^1$H-NMR, the detection limit for eugenol siloxane carbonate groups being about 5000 parts per million (ppm). Haze values were determined using a BYK GARDNER HAZE-GARD PLUS haze measuring instrument on solutions of the product polymers in methylene chloride, said solutions being about 15 percent by weight product polymer. Solution haze values correlate reasonably well with haze values measured on molded plaques as the following data illustrate. In general, when a sample has a haze value under about 5 percent it will appear transparent to the human eye.

| % Haze 1/8$^{th}$ Inch Plaque$^a$ | % Haze 15% Solution in $CH_2Cl_2$$^{a,b}$ |
|---|---|
| 1.8 | 2.2 |
| 4.7 | 5.8 |
| 7.8 | 15.9 |
| 13.2 | 39.5 |
| 98 | 85.7 |

$^a$Haze measurements made on a BYK GARDNER HAZE-GARD PLUS instrument.
$^b$Samples Measurements were made on samples contained in a solution cell 1 cm in thickness, said cell being sufficiently wide to completely cover the 25 mm (diameter) circular light port of a calibrated BYK GARDNER HAZE-GARD PLUS instrument Examples 1–3

Preparation of Eugenol Siloxane Bischloroformate Starting Material

Three batches of eugenol siloxane bischloroformate (Examples 1–3) were prepared in a tubular flow reactor as follows. Three feed solutions; a 20 weight percent solution of d-50 eugenol siloxane bisphenol (EuSiD50) in methylene chloride, NaOH in water, and phosgene were introduced into a tubular flow reactor in the amounts and feed rates indicated. Each feed solution was delivered independently to the reactor. The d-50 eugenol siloxane bisphenol in methylene chloride solution was pre-cooled in a coil immersed in an ice water bath. The discharge end of the reactor was vented to a scrubber at atmospheric pressure. The pressure at the feed side of the reactor was 3–5 psig. The tubular flow reactor used is shown in FIG. 1 and comprised a series of KO-FLO® static mixers configured as follows: one Type A tubular reactor section followed by six Type B tubular reactor sections. The Type A tubular reactor section comprised six static mixers, each of said mixers being 7 inches in length and having an outer diameter of ¼ of an inch. Each of the Type B tubular reactor sections comprised three static mixers; a first static mixer (11 inches in length, ¼ inch outer diameter), a second static mixer (16 inches in length, ⅜ inch outer diameter), and a third static mixer (16 inches in length, ½ inch outer diameter). The total reactor volume was about 252 milliliters (mL). The initial sections of the reactor were wrapped with woven fabric insulating material. Sampling points were located at several locations along the flow reactor. Sample point 13 was located at the downstream end of the sixth Type B tubular reactor section and corresponded to a reactor volume of about 252 mL. Sample point 8 was located at the downstream edge of the first type B tubular reactor section (that tubular reactor section following the Type A reactor section) and corresponded to a reactor volume of about 57 mL. Sample point 7 was located at the downstream end of the Type A tubular reactor section. Typical residence times are illustrated by Example 2 wherein the residence time was about 27 seconds at sample point 7 and about 360 seconds at sample point 13. In Examples 1–3 the feed containing the eugenol siloxane bisphenol was introduced at a rate corresponding to the addition of 7.6 grams per minute EuSiD50 (d-50 eugenol siloxane bisphenol) and 30.4 grams per minute methylene chloride. The concentration and rate of addition of the aqueous sodium hydroxide is given in Table 1. The rate of phosgene addition in each of Examples 1–3 is also given in Table 1.

reflux condenser, a phosgene inlet tube, an inlet tube for the introduction of aqueous sodium hydroxide solution (50 percent by weight NaOH), and a pH probe connected to a feedback mechanism controlling the amount of sodium hydroxide solution added as a function of reaction mixture pH. The reaction vessel was charged with 800 mL $CH_2Cl_2$, 450 mL deionized water, 200 gm BPA, and 0.25 mL triethylamine. Phosgene gas was introduced at a rate of about 4 grams/per minute until a total of 65.07 grams (0.75 mole $COCl_2$ per mole BPA) had been added. During the addition of the phosgene the pH of the reaction mixture was maintained at about 10.5 by addition of 50 percent by weight sodium hydroxide solution. Following the phosgenation stage the reaction mixture was made acidic with 1N hydrochloric acid (HCl), and the organic and brine phases were separated. The organic phase was washed twice with 1N HCl and once with deionized water to provide a solution containing a product hydroxy-terminated oligomeric BPA polycarbonate having a weight-average molecular weight ($M_w$) of about 2,735 daltons relative to polystyrene molecular weight standards. This material was designated "Oligomer Solution A".

Example 5

This procedure followed in Example 4 was repeated and yielded a solution containing a hydroxy-terminated oligomeric BPA polycarbonate with a weight-average molecular weight of 2,494 daltons relative to polystyrene standards. This material was designated "Oligomer Solution B".

Example 6

A 30-liter reactor equipped essentially as in Example 4 was charged with 9.0 liters of methylene chloride solvent

TABLE 1

REACTION CONDITIONS FOR PREPARATION OF EUGENOL SILOXANE BISCHLOROFORMATE STARTING MATERIAL

| Example | COC12 gm/min | NaOH Soln gm/min | NaOH ° C. | Point 6 Temp ° C.[a] | Feed Pressure psig | Residence Time Point 7 (sec) | Residence Time Point 13 (sec) | Molar ratio $COCl_2$/Eugenol siloxane OH | NaOH/ $COCl_2$[c] | wt % NaOH | % Conversion to Chloroformate Sample Point 13 |
|---|---|---|---|---|---|---|---|---|---|---|---|
| 1 | 1.12 | 10.38 | 15.8 | 43.3 | 5 | — | 804[b] | 3 | 4 | 17.5 | 97.7 |
| 2 | 1.87 | 15.79 | 11.4 | 40.2 | 5 | 27 | 360 | 5 | 5 | 24 | >99.5 |
| 3 | 1.87 | 17.22 | 14.0 | 43.8 | 4.5 | 27 | 360 | 5 | 5 | 22 | >99.5 |

[a]Point 6 located between the fifth and sixth static mixing elements of the Type A tubular reaction section (Labeled "Point 6" in FIG. 1.)
[b]Each Type B tubular reactor section was followed by a 10 foot long ¼" o.d. copper tube having a volume of 48 mL. The total reactor volume for this example was 540 mL.
[c]mole NaOH per mole of phosgene In Example 1 very high conversion (97.7 percent conversion) of eugenol siloxane bisphenol OH groups to the corresponding bischloroformate was observed. In Examples 2 and 3 essentially complete conversion of eugenol siloxane bisphenol to eugenol siloxane bischloroformate was achieved. No carbonate was detected by proton NMR in any of the product bischloroformates of Examples 1–3. The product eugenol siloxane bischloroformates in Examples 1–3 were obtained as solutions in methylene chloride which were used in subsequent polymerization reactions without further purification.

Examples 4–6
Preparation of Hydroxy-Terminated BPA Polycarbonate Oligomers

Example 4

The reaction vessel was a 2-liter glass reactor equipped with 2 identical six blade impellers, a recirculation loop, a ($CH_2Cl_2$), 2280 grams of BPA, 5.1 liters of water, 2.8 milliliters of triethylamine catalyst, and 5 milliliters of 50 percent by weight sodium hydroxide solution. The reaction vessel was equipped with a pH probe and a manually operated inlet for the addition of aqueous sodium hydroxide. Phosgene was added at a rate such that the rate of addition of the sodium hydroxide solution was initially 37 milliliters per minute in order to maintain the pH of the reaction mixture at about 10.5. As the phosgenation continued the amount of sodium hydroxide required to maintain a pH of 10.5 decreased. By the end of the phosgenation, the rate of addition of sodium hydroxide solution needed to maintain a pH of 10.5 was about 18 milliliters per minute. The total amount of sodium hydroxide solution added during the phosgenation was 800 milliliters and the final pH of the reaction mixture was about 10.5. After phosgene introduction was halted the reaction mixture was acidified with 1 N HCl to a pH of from about 6 to about 6.2 and the organic phase was separated from the brine phase. The organic phase was then washed twice with 1 N HCl and once with water to give a solution containing a hydroxy-terminated oligomeric BPA polycarbonate with a weight-average molecular weight of 2,603 daltons relative to polystyrene standards. This material was designated "Oligomer Solution C".

Examples 7–11
Preparation of Silicone-containing Copolycarbonates Using Eugenol Siloxane-Containing Less Than 0.5 Percent Residual Hydroxy Endgroups Five reactions were run to make silicone-containing copolycarbonates using the starting materials prepared in Examples 2–6. Comparative Examples 1 and 2 were carried out in order to demonstrate the unique capability of method of the present invention to provide silicone-containing copolycarbonates having low haze. The silicone-containing copolycarbonates prepared by the method of the present invention are shown to possess haze values comparable to polycarbonate. Results are summarized in Table 2.

Example 7

To a 2-liter reaction vessel equipped essentially as in Example 4 was added 151.9 milliliters of Oligomer Solution B, 470 mL deionized water, 437.5 mL methylene chloride, 1.2 mL triethylamine, and 13.6 grams of sodium chloride. The pH of the aqueous layer was adjusted to pH about 11.8 by the addition of 50 percent by weight sodium hydroxide solution. To this mixture was added dropwise over a period of 8 minutes 32.1 grams of the eugenol siloxane bischloroformate solution obtained in Example 2. The pH was maintained at 11.8 by addition of 50 percent by weight sodium hydroxide solution. One minute after the eugenol siloxane bischloroformate solution addition was complete, the reaction mixture tested negative for chloroformate groups. BPA (93.75 grams) and p-cumylphenol (6.39 grams) were then added to the reactor. Phosgene gas was then introduced at a rate of 3 grams per minute until 39.5 grams of phosgene had been added. The rate of phosgene introduction was then reduced to 2 grams per minute and an additional 15.16 grams of phosgene was added to the reaction mixture. During the phosgenation step just described, the pH of the reaction mixture was maintained at about 10.5 by the addition of 50 percent by weight sodium hydroxide solution. When the phosgenation step was complete, the pH was held at about 10.5 for 1 minute, and the contents of the reactor were transferred to a separatory funnel. The phases were separated and the organic phase was washed with 1 N HCl and water. The product silicone-containing copolycarbonate was isolated by addition the solution of the product copolycarbonate to boiling water under high shear. The product silicone-containing copolycarbonate was dried and characterized by proton nuclear magnetic resonance ($^1$H-NMR) and was found to contain 4.22 wt % siloxane. A solution prepared by dissolving the isolated silicone-containing copolycarbonate in methylene chloride, said solution containing 15 percent by weight of the product silicone-containing copolycarbonate, was found to have a haze value of 3.75%.

Example 8

The procedure of Example 7 was repeated except that the eugenol siloxane bischloroformate solution was added over a 2 minute period. The isolated product silicone-containing copolycarbonate was shown by $^1$H-NMR to contain 4.26 wt % siloxane. A solution prepared by dissolving the isolated silicone-containing copolycarbonate in methylene chloride, said solution containing 15 percent by weight of the product silicone-containing copolycarbonate, was found to have a haze value of 4.11%.

Example 9

To a 2-liter reaction vessel equipped as in Example 4 was added 176.2 mL (229 gm) of Oligomer Solution C, 484 mL of methylene chloride, 525 mL of deionized water, 1.33 mL of triethylamine, and 13.46 grams of sodium chloride. The pH of the aqueous layer was raised to about 11.8 by the addition of 2.58 grams of 50 percent by weight sodium hydroxide solution. To this mixture was added dropwise, over a period of 150 seconds, 36.1 grams of the eugenol siloxane bischloroformate solution obtained in Example 3, the pH being maintained throughout the addition at pH at 11.8 by the addition of 50 percent by weight sodium hydroxide solution. Three minutes after completion of the addition of the eugenol siloxane bischloroformate solution, the reaction mixture tested negative for chloroformate groups. BPA (105 grams) and p-cumylphenol (7.16 grams) were then added to the reactor. Phosgene gas (61.22 grams) was then added to the reactor at about 3 grams per minute while adding sufficient 50 percent by weight sodium hydroxide solution to maintain a pH setpoint of 10.5. Upon completion of the phosgene addition the reaction mixture was allowed to stand for about one minute and the product silicone-containing copolycarbonate was then isolated as described in Example 7. The isolated silicone-containing copolycarbonate was shown by $^1$H-NMR to contain 4.31 wt % siloxane. A solution prepared by dissolving the isolated silicone-containing copolycarbonate in methylene chloride, said solution containing 15 percent by weight of the product silicone-containing copolycarbonate, was found to have a haze value of 1.69%.

Example 10

To a 2-liter reaction vessel equipped as in Example 7 was added 353 mL of oligomer solution C, 247 mL of methylene chloride, 448 mL of deionized H$_2$O, 26.92 grams of sodium chloride, and 0.78 mL triethylamine. The pH was increased to pH 12.0 by the addition of 3.99 grams of 50 weight percent sodium hydroxide solution. Then 36.1 grams of the eugenol siloxane bischloroformate solution prepared in Example 3 was added over a period of 4 minutes, while maintaining the pH at 12.0. Three minutes after the completion of the bischloroformate addition, 90 mL of methylene chloride, 77 mL of deionized H$_2$O, 70 grams of BPA, and 7.16 grams of p-cumylphenol were added. Phosgene gas (47.56 grams) was then introduced into the reactor at a rate of 3.0 grams per minute while maintaining the pH at 10.5 by addition of 50 weight percent sodium hydroxide solution. Upon completion of the phosgene addition the reaction mixture was allowed to stand briefly and the product silicone-containing copolycarbonate was then isolated as described in Example 7. The isolated silicone-containing copolycarbonate was shown by $^1$H-NMR to contain 4.25wt % siloxane. A solution prepared by dissolving the isolated silicone-containing copolycarbonate in methylene chloride, said solution containing 15 percent by weight of the product silicone-containing copolycarbonate, was found to have a haze value of 1.54%.

Example 11

To a 2-liter reaction vessel equipped as in Example 4 was added 176.2 mL of Oligomer Solution C, 525 mL of deionized water, 484 mL of methylene chloride, 1.33 mL of triethylamine, and 13.46 grams of sodium chloride. The pH of the mixture was raised to pH 11.8 by the addition of 2.75 grams of 50 percent by weight sodium hydroxide solution. To this mixture was added over a period of 2–3 seconds, 36.1 grams of the eugenol siloxane bischloroformate solution prepared in Example 2, the pH being maintained at pH 11.8 by the addition of 50 percent by weight sodium hydroxide solution. Three minutes after completion of the addition of the eugenol siloxane bischloroformate solution, the reaction mixture tested negative for chloroformate groups. BPA (105 grams) and p-cumylphenol (7.16 grams) were then added to the reactor. Phosgene gas (61.22 grams) was then added to the reactor at about 2 to3 grams per minute until all of the phosgene had been introduced. During the phosgene addition the pH of the reaction mixture was maintained at about 10.5 by the addition of 50 percent by weight sodium hydroxide solution. After the phosgene addition was complete, the pH was held at about 10.5 for 1 minute, and the product silicone-containing copolycarbonate was then isolated as described in Example 7. The isolated silicone-containing copolycarbonate was shown by $^1$H-NMR to contain 4.31 wt % siloxane. A solution prepared by dissolving the isolated silicone-containing copolycarbonate in methylene chloride, said solution containing 15 percent by weight of the product silicone-containing copolycarbonate, was found to have a haze value 1.83%.

Comparative Example 1

Haze Behavior of Interfacially Prepared BPA Polycarbonate

To a 2-liter reaction vessel equipped as in Example 4 was added 100 grams of BPA, 5.11 grams of p-cumylphenol, 375 mL of deionized water, 450 mL of $CH_2Cl_2$, and 0.612 mL triethylamine. Phosgene gas (51.6 grams) was added at a rate of 3 grams per minute. During the phosgene addition the pH of the reaction mixture was maintained at about 10.5 by the addition of 50 percent by weight sodium hydroxide solution. After the phosgene addition was complete, the pH was held at about 10.5 for 1 minute, and the product homopolycarbonate was then isolated as described in Example 7. A solution prepared by dissolving the isolated homopolycarbonate in methylene chloride, said solution containing 15 percent by weight of the product homopolycarbonate, was found to have a haze value of 1.58%.

Comparative Example 2

Haze Behavior of Interfacially Prepared BPA Polycarbonate

The process described in Comparative Example 2 was repeated to yield a bisphenol A homopolycarbonate. A solution prepared by dissolving the isolated homopolycarbonate in methylene chloride, said solution containing 15 percent by weight of the product homopolycarbonate, was found to have a haze value of 0.84%.

Data for the silicone-containing copolycarbonates of Examples 7–11 and the bisphenol A homopolycarbonates of Comparative Examples 1 and 2 are gathered in Table 2. The data reveal that silicone-containing copolycarbonates possessing low haze properties may be prepared using the method of the present invention. In addition, the silicone-containing copolycarbonates prepared by the method of the present invention are shown to possess haze values comparable to bisphenol A homopolycarbonate.

TABLE 2

PROPERTIES OF SILICONE-CONTAINING COPOLYCARBONATES

| Example | Oligomer Solution | EuSiBCF[a] Solution | EuSiBCF[a] addition time | Wt % Siloxane in product[b] | % Haze[c] |
|---|---|---|---|---|---|
| 7 | B | Ex-2[d] | 480 seconds | 4.22 | 3.75 |
| 8 | B | Ex-2 | 120 seconds | 4.26 | 4.11 |
| 9 | C | Ex-3 | 150 seconds | 4.31 | 1.69 |
| 10 | C | Ex-3 | 240 seconds | 4.25 | 1.54 |
| 11 | C | Ex-2 | 2–3 seconds | 4.31 | 1.83 |
| CE-1 | none | none | | 0 | 1.58 |
| CE-2 | none | none | | 0 | 0.84 |
| CE-3 | none | Ex-2 | 206 | 4.23 | 11.5 |
| CE-4 | none | none[e] | | 0.96 | 68.0 |

[a]EuSiBCF = eugenol siloxane bischloroformate
[b]Determined by proton NMR
[c]Measured on a 15 wt % solution of isolated product polymer in methylene chloride
[d]Ex-2 = the Eugenol siloxane bischloroformate solution prepared in Example 2 and so forth.
[e]Siloxane-containing monomer was EuSiD50.

The effect of siloxane bischloroformate residual hydroxy endgroup concentration was studied in Examples 12–14 which employed eugenol siloxane bischloroformates having a residual hydroxy endgroup concentrations of about 2.3 percent or higher. The eugenol siloxane bischloroformate used in Examples 12–14 was that prepared in Example 1 and comprised about 97.7 percent chloroformate endgroups, about 2.3 residual hydroxy endgroups and no detectable amount of carbonate groups. In Example 12 the eugenol siloxane bischloroformate solution of Example 1 was used without alteration. In Examples 13 and 14, eugenol siloxane bisphenol (EuSiD50) was added to increase the amount of residual hydroxy endgroup present in the eugenol siloxane bischloroformate solution. The total amount of siloxane-containing monomers was kept the same in Examples 12–14 and the siloxane content of each of the product silicone-containing copolycarbonates was about 4.1 percent by weight. Data for Examples 12–14 are gathered in Table 3 and demonstrate the effect of siloxane bischloroformate purity on the haze properties of product silicone-containing copolycarbonate. The data show that as the purity of the siloxane bischloroformate decreases haze value increases. In applications requiring a high level of transparency, it is preferable that the solution haze value measured for the silicone-containing copolycarbonate be less than about 10% and even more preferably less than about 5%, and yet still more preferably less than about 2%.

Example 12

Siloxane Bischloroformate Contained About 2.3% Residual OH Groups

To a 2-liter reactor equipped as in Example 4 was added 121.5 mL of Oligomer Solution A, 350 mL of methylene chloride, 375 mL of deionized $H_2O$, 10.88 grams of sodium chloride, and 0.95 mL triethylamine. The pH of the aqueous layer was adjusted to pH about 11.8 by the addition of 50 weight percent sodium hydroxide solution. To this mixture was added dropwise over a period of 110 seconds 25.69 grams of the eugenol siloxane bischloroformate solution prepared in Example 1. During the addition the pH was maintained at pH 11.8. Approximately 5 minutes after the end of the siloxane bischloroformate addition, 75 grams BPA and 5.11 grams p-cumylphenol were added to the reactor. Phosgene gas (42.8 grams) was then introduced at a rate of 3.0 grams per minute. During phosgenation the pH was maintained at pH 10.5 by the addition of 50 percent by weight sodium hydroxide solution. Upon completion of the phosgene addition the reaction mixture was allowed to stand briefly and the product silicone-containing copolycarbonate was then isolated as described in Example 7. The reaction product was worked up as usual. A solution prepared by dissolving the isolated silicone-containing copolycarbonate in methylene chloride, said solution containing 15 percent by weight of the product silicone-containing copolycarbonate, was found to have a haze value of 12.8%.

Example 13

Siloxane Bischloroformate Contained About 5% Residual OH Groups

The reaction was carried out as in Example 11 except that about 2.5 weight percent of the siloxane bischloroformate was replaced with eugenol siloxane bisphenol (EuSiD50) to give a eugenol siloxane bischloroformate comprising about 5 percent residual hydroxy endgroups. A solution prepared by dissolving the isolated silicone-containing copolycarbonate in methylene chloride, said solution containing 15 percent by weight of the product silicone-containing copolycarbonate, was found to have a haze value of 20.6%.

Example 14

Siloxane Bischloroformate Contained About 7.5% Residual OH Groups

The reaction was carried out as in Example 12 except that about 5 weight percent of the siloxane bischloroformate was replaced with eugenol siloxane bisphenol (EuSiD50) to give a eugenol siloxane bischloroformate comprising about 7.5 percent residual hydroxy endgroups. A solution prepared by dissolving the isolated silicone-containing copolycarbonate in methylene chloride, said solution containing 15 percent by weight of the product silicone-containing copolycarbonate, was found to have a haze value of 26.7%.

TABLE 3

EFFECT OF SILOXANE BISCHLOROFORMATE RESIDUAL HYDROXY GROUP LEVELS ON PROPERTIES OF SILICONE-CONTAINING COPOLYCARBONATES

| Example | % Residual OH Endgroups in EUSiBCF[a] | EUSiBCF[a] addition time | Wt % Siloxane in product[b] | % Haze[c] |
|---|---|---|---|---|
| 12 | 2.3% | 110 seconds | 4.09 | 12.8 |
| 13 | 5% | 107 seconds | 4.14 | 20.6 |
| 14 | 7.5 | 110 seconds | 4.11 | 26.7 |
| CE-1 | none | | 0 | 1.58 |
| CE-2 | none | | 0 | 0.84 |

[a]EuSiBCF = eugenol siloxane bischloroformate
[b]Determined by proton NMR
[c]Measured on a 15 wt % solution of isolated product polymer in methylene chloride

Comparative Examples 3–4

Effect of Alternate Process Steps

Comparative Examples 3 and 4 demonstrate the effect of the process on the properties of silicone-containing copolycarbonates. In Comparative Example 3 the process of the present invention is altered such that all of the bisphenol was charged to the reactor at the outset of the reaction. The bisphenol was reacted with phosgene under interfacial conditions to give to give a hydroxy terminated polycarbonate oligomer. The hydroxy terminated polycarbonate oligomer is was then reacted under interfacial conditions with the siloxane bischloroformate to give a silicone-containing reaction product which was then reacted with additional phosgene to give a silicone-containing copolycarbonate having a haze value much higher than a similarly constituted silicone-containing copolycarbonate prepared according to the method of the present invention (Compare with Examples 7–11). In Comparative Example 4 all of the organic reactants, d-50 eugenol bisphenol, BPA, and p-cumylphenol were charged to a flask and reacted with phosgene under standard interfacial polymerization conditions. Although the amount of the siloxane-containing monomer used was small relative to Examples 7–11, and the weight percent siloxane present in the product silicone-containing copolycarbonate was low (0.96 weight percent siloxane), the product in Comparative Example 4 evinced a marked tendency towards lack of transparency relative to the products of Examples 7–11. Data for Comparative Examples 3 and 4 is presented in Table 2.

Comparative Example 3

All Bisphenol Added Initially

To a 2-liter reaction vessel equipped as in Example 4 was added 140 grams of BPA, 525 mL of deionized water, 630 mL of methylene chloride, and 1.36 mL of triethylamine. The pH of the mixture was raised to pH 10.5 (first setpoint) by the addition of 50 percent by weight sodium hydroxide solution. Phosgene gas was then added to the reactor at about 3 grams per minute until a total of 73.0 grams of phosgene had been added. After 20 grams of phosgene had been added the pH controller was adjusted to maintain a pH of about 11.5 (second setpoint) and a mixture of 36.1 grams of the eugenol siloxane bischloroformate solution prepared in Example 2 and 5.28 grams of phenyl chloroformate was added dropwise over a period of about 206 seconds. After completion of the addition of the siloxane bischloroformate solution the pH controller setpoint was returned to pH 10.5 and the pH of the reaction mixture was maintained at about 10.5 throughout the rest of the reaction. After the phosgene addition was complete, the pH was held at about 10.5 for 1 minute, and the product silicone-containing copolycarbonate was then isolated as described in Example 7. The isolated silicone-containing copolycarbonate was shown by $^1$H-NMR to contain 4.23 wt % siloxane. A solution prepared by dissolving the isolated silicone-containing copolycarbonate in methylene chloride, said solution containing 15 percent by weight of the product silicone-containing copolycarbonate, was found to have a haze value of 11.5%.

Comparative Example 4

Direct Phosgenation of Siloxane Bisphenol and Bisphenol

To a 500 mL reaction vessel equipped as in Example 4 was added 0.19 grams of d-50 eugenol siloxane bisphenol (EuSiD50), 15.78 grams of BPA, 0.85 grams of p-cumylphenol, 70 mL of methylene chloride, 70 mL of deionized water, and 150 microliters of triethylamine. The pH of the mixture was raised to pH 10.5 by the addition of 50 percent by weight sodium hydroxide solution. Phosgene gas was then added to the reactor at about 0.5 grams per minute until a total of 8.52 grams (20 percent excess phosgene). During phosgene addition the pH of the reaction mixture was maintained at pH 10.5 by the addition of 50 weight percent sodium hydroxide solution. After the phosgene addition was complete the reaction mixture was sparged with nitrogen to remove excess phosgene. Methylene chloride (35 mL) was then added and the product silicone-containing copolycarbonate was isolated as described in Example 7. The product had a weight average molecular weight of about 38000 daltons. $^1$H-NMR revealed the presence of about 0.96 percent by weight siloxane units in the product silicone-containing copolycarbonate. A solution prepared by dissolving the isolated silicone-containing copolycarbonate in methylene chloride, said solution containing 15 percent by weight of the product silicone-containing copolycarbonate, was found to have a haze value of 68%.

The silicone-containing polycarbonate intermediates prepared in Examples 7–14 were characterized by gel permeation chromatography (GPC) using polystyrene molecular weight standards. The intermediates were characterized by comparing the weight average molecular weight ($M_w$) of the starting hydroxy-terminated polycarbonate oligomer with the molecular weight of the silicone-containing polycarbonate intermediate formed in each of Examples 7–14. Data are gathered in Table 4 and illustrate modest molecular weight increases over the starting hydroxy-terminated polycarbonate oligomers due to the presence of the starting hydroxy terminated polycarbonate oligomers in a substantial molar excess over the siloxane bischloroformates employed.

TABLE 4

PROPERTIES OF SILICONE-CONTAINING POLYCARBONATE INTERMEDIATES

| Example | Oligomer Solution | EuSiBCF[a] Solution | Hydroxy-terminated PC Oligomer $M_w$[b] | Silicone-Containing Intermediate $M_w$ |
|---|---|---|---|---|
| 7 | B | Ex-2[c] | 2,494 | 3,566 |
| 8 | B | Ex-2 | 2,494 | 3,430 |
| 9 | C | Ex-3 | 2,603 | 3,601 |
| 10 | C | Ex-3 | 2,603 | 2,974 |
| 11 | C | Ex-2 | 2,603 | 3,446 |
| 12 | A | Ex-1 | 2,735 | 3,606 |
| 13 | A | Ex-1 + EuSiD50[d] | 2,735 | 3,609 |
| 14 | A | Ex-1 + EuSiD50[d] | 2,735 | 3,566 |

[a]EuSiBCF = eugenol siloxane bischloroformate
[b]In daltons
[c]Ex-2 = the Eugenol siloxane bischloroformate solution prepared in Example 2 and so forth.
[d]Siloxane bischloroformate was spiked with siloxane bisphenol EuSiD50.

The invention has been described in detail with particular reference to preferred embodiments thereof, but it will be understood by those skilled in the art that variations and modifications can be effected within the spirit and scope of the invention.

What is claimed is:

1. A method of preparing silicone-containing copolycarbonates said method comprising:
    Step (a) contacting a hydroxy-terminated polycarbonate oligomer with a siloxane bischloroformate under interfacial reaction conditions to afford a silicone-containing polycarbonate intermediate;
    Step (b) reacting said intermediate under interfacial reaction conditions with at least one bisphenol, at least one endcapping agent, and phosgene to provide a silicone-containing copolycarbonate.

2. A method according to claim 1 wherein said hydroxy-terminated polycarbonate oligomer has a weight average molecular weight in a range between about 500 and 15000 daltons.

3. A method according to claim 1 wherein said hydroxy-terminated polycarbonate oligomer has a percent endcap of 25 percent or less.

4. A method according to claim 1 wherein said hydroxy-terminated polycarbonate oligomer comprises structural units derived from at least one dihydroxy aromatic compound.

5. A method according to claim 3 wherein said dihydroxy aromatic compound is selected from the group of aromatic diols consisting of hydroquinone, resorcinol, methylhydroquinone, 2,6-dihydroxynaphthalene, 1,4-dihydroxynaphthalene, 4-methylresorcinol, and 5-methylresorcinol.

6. A method according to claim 4 wherein said dihydroxy aromatic compound is a bisphenol having structure I

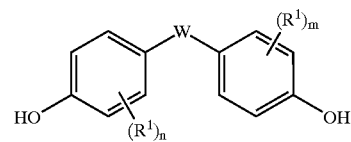

I wherein $R^1$ is independently at each occurrence a halogen atom, nitro group, cyano group, $C_1$–$C_{20}$ alkyl group. $C_4$–$C_2$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a C6–C20 cycloaliphatic radical, or the group

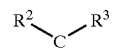

wherein $R^2$ and $R^1$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_1$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

7. A method according to claim 6 wherein said bisphenol having structure I is selected from the group consisting of bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane: 1,1-bis(4-hydroxy-3-methylphenyl) cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether, 4,4'-dihydroxydiphenylthioether, 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl) benzene and 1,4-bis(2-(4-hydroxy-3-methylphenyl)-2-propyl)benzene.

8. A method according to claim 1 wherein said siloxane bischloroformate comprises structure II

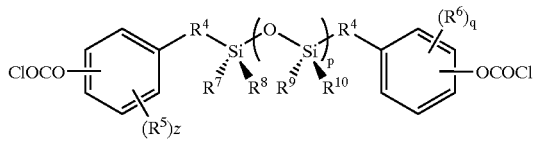

wherein R⁴ is independently at each occurrence a $C_1$–$C_{10}$ alkylene group optionally substituted by one or more $C_1$–$C_{10}$ alkyl or aryl groups, an oxygen atom, an oxyalkyleneoxy moiety

or an oxyalkylene moiety

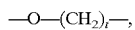

where t is an integer from 2–20;

R⁵ and R⁶ are each independently at each occurrence halogen, $C_1$–$C_6$ alkoxy, $C_1$–$C_6$ alkyl, or $C_6$–$C_{10}$ aryl;

z and q are independently integers from 0–4;

R⁷, R⁸, R⁹ and R¹⁰ are each independently at each occurrence $C_1$–$C_6$ alkyl, aryl, $C_2$–$C_6$ alkenyl, cyano, trifluoropropyl, or styrenyl; and p is an integer from 1 to about 100.

9. A method according to claim 8 wherein said siloxane bischloroformate is selected from the group consisting of eugenol siloxane bischloroformate III

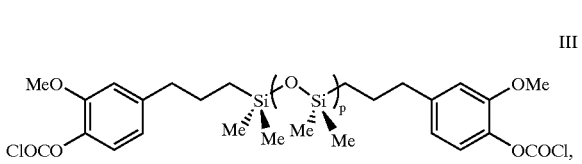

4-allyl-2-methylphenyl siloxane bischloroformate IV

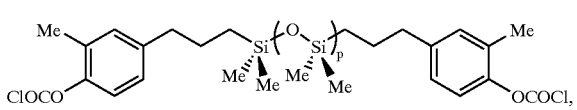

2-allylphenyl siloxane bischloroformate V

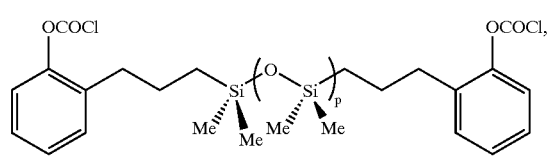

4-allylphenyl siloxane bischloroformate VI

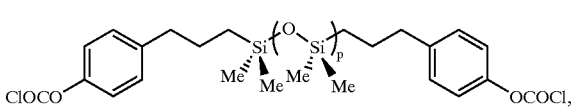

4-allylphenyl siloxane bischloroformate VII

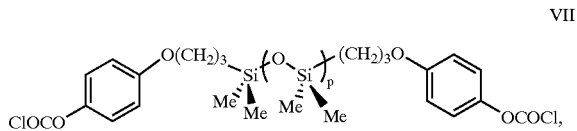

and 4-vinylphenyl siloxane bischloroformate VIII

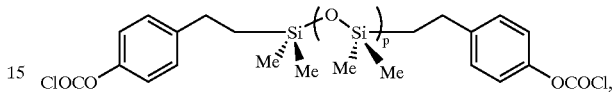

wherein in structures u-yin p is an integer from 1 to about 100.

10. A method according to claim 8 wherein said siloxane bischloroformate having structure II comprises fewer than 5 percent hydroxy groups.

11. A method according to claim 1 wherein said siloxane bischloroformate having structure II comprises fewer than 5 percent hydroxy groups.

12. A method according to claim 1 wherein said silicone-containing polycarbonate intermediate comprises between about 0.1 and about 40 percent by weight siloxane.

13. A method according to claim 1 wherein said bisphenol has structure I

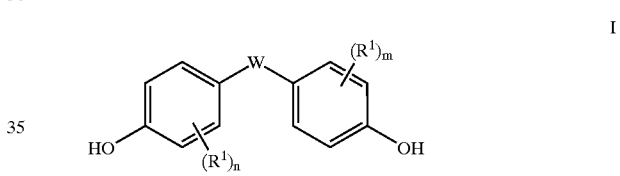

wherein R¹ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

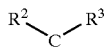

wherein R² and R³ are independently a hydrogen atom, $C_1$–$C_{20}$ alkyl group, $C_4$–$C_{20}$ cycloalkyl group, or $C_4$–$C_{20}$ aryl group; or R² and R³ together form a $C_4$–$C_{20}$ cycloaliphatic ring which is optionally substituted by one or more $C_1$–$C_{20}$ alkyl, $C_6$–$C_{20}$aryl, $C_2$–$C_{21}$ aralkyl, $C_5$–$C_{20}$ cycloalkyl groups or a combination thereof.

14. A method according to claim 13 wherein said bisphenol having structure I is selected from the group consisting of bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'- dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl) benzene; and 1,4-bis(2-(4-hydroxy-3-methylphenyl)-2-propyl)benzene.

15. A method according to claim 1 wherein the silicone-containing copolycarbonate comprises repeat units derived from said bisphenol recited instep (b) in an amount corresponding to between about 0.1 and about 95 percent by weight of the total weight of the silicone-containing copolycarbonate.

16. A method according to claim 1 wherein said endcapping agent is selected from the group consisting of mono-hydroxy aromatic compounds, aliphatic acid chlorides, aromatic acid chlorides, aliphatic monochloroformates, and aromatic monochloroformates.

17. A method according to claim 16 wherein the endcapping agent is a monohydroxy aromatic compound having structure X

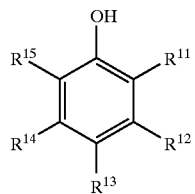

X wherein $R^{11}$—$R^{15}$ are independently a hydrogen atom, a halogen atom, a $C_1$–$C_{20}$ alkyl group, a $C_6$–$C_{20}$ aryl group, a $C_7$–$C_{21}$ aralkyl group, a $C_5$–$C_{20}$ cycloalkyl group, a $C_2$–$C_{20}$ aliphatic radical, a $C_4$–$C_{20}$ cycloaliphatic radical, or a $C_5$–$C_{20}$ aromatic radical.

18. A method according to claim 17 wherein said endcapping agent is selected from the group consisting of phenol, p-cumylphenol, cardanol, octadecylphenol, dodecylphenol, mesitol, 2,6-xylenol; 2,4-xylenol; 2,5-xylenol 2,3,5-xylenol; 2,3,6-xylenol; 2,4,6-triethylphenol: 2,4-di-t-butylphenol, 3,5-di-t-butylphenol, 2,6-dimethyl-4-nonylphenol; 2,6-dibromophenol; 2,5-dibromophenol; 2,6-dichlorophenol; 2,5-dichlorophenol 4-chloro-2,6-dibromophenol; 4-bromo-2,6-dichlorophenol; 2,4,6-tribromophenol; 2,3,6-tribromophenol; 2,4,6-trichlorophenol; 2,3,6-trichlorophenol; 2,6-dimethyl-4-bromophenol; 4-t-butyl-2,6-dimethylphenol; 2,6-di-t-butyl-4-methylphenol, 3-t-butyl-2,6-dimethyl phenol; 2,6-diphenylphenol; 2-phenylphenol, 2-methyl-6-phenylphenol; 2-methyl-4-phenylphenol; 2,6-dimethyl-4-phenylphenol; 4-propenylphenol; and 4-(4-hydroxyphenyl)-2,2,4-trimethylchroman.

19. A silicone-containing copolycarbonate prepared by the method of claim 1.

20. A method of preparing silicone-containing copolycarbonates said method comprising:

Step (a) contacting under interfacial reaction conditions to afford a silicone-containing polycarbonate intermediate, a hydroxy-terminated bisphenol A polycarbonate oligomer having a weight average molecular weight in a range from about 1000 to about 3000 daltons with eugenol siloxane bischloroformate III

III

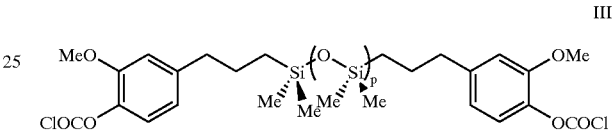

wherein p is an integer in a range between 1 and about 100; and

Step (b) reacting said intermediate under interfacial reaction conditions with bisphenol A, p-cumylphenol, and phosgene to provide a silicone-containing copolycarbonate comprising between about 0.1 and about 10 percent by weight siloxane units.

21. A silicone-containing copolycarbonate prepared by the method of claim 20.

* * * * *